United States Patent [19]
Goodale

[11] Patent Number: 5,879,758
[45] Date of Patent: Mar. 9, 1999

[54] METHOD OF MANUFACTURE OF COATED FIBER MATERIAL SUCH AS A FLY LINE

[75] Inventor: Robert H. Goodale, Boulder, Colo.

[73] Assignee: Flow Tek, Inc., Boulder, Colo.

[21] Appl. No.: 846,126

[22] Filed: Apr. 25, 1997

Related U.S. Application Data

[62] Division of Ser. No. 251,244, May 31, 1994, Pat. No. 5,625,976.

[51] Int. Cl.⁶ .................................. B05D 1/36; B05D 3/06
[52] U.S. Cl. .......................... 427/501; 427/505; 427/507; 427/412.1
[58] Field of Search ..................... 427/496, 501, 427/505, 507, 412.1

[56] References Cited

U.S. PATENT DOCUMENTS

| | | |
|---|---|---|
| 1,602,312 | 10/1926 | Qurin . |
| 2,164,296 | 6/1939 | Wilcox . |
| 3,043,045 | 7/1962 | Martuch . |
| 3,063,189 | 11/1962 | Keller . |
| 3,334,436 | 8/1967 | Cole, Jr. . |
| 3,435,552 | 4/1969 | Caldwell . |
| 3,486,266 | 12/1969 | Richardson et al. . |
| 3,512,294 | 5/1970 | Howald . |
| 3,748,168 | 7/1973 | Schmidt . |
| 3,830,009 | 8/1974 | Collingbourne . |
| 3,914,480 | 10/1975 | Lang . |
| 4,048,744 | 9/1977 | Chandler . |
| 4,276,908 | 7/1981 | Horne . |
| 4,321,854 | 3/1982 | Foote et al. . |
| 4,386,132 | 5/1983 | Dille et al. . |
| 4,550,938 | 11/1985 | Nakanishi et al. . |
| 4,584,240 | 4/1986 | Herbert . |
| 4,606,144 | 8/1986 | Sasaki et al. . |
| 4,952,344 | 8/1990 | Burgess . |
| 5,207,732 | 5/1993 | Stark . |
| 5,296,292 | 3/1994 | Butters . |
| 5,374,600 | 12/1994 | Hozumi . |

FOREIGN PATENT DOCUMENTS

| | | |
|---|---|---|
| 1-074942 | 3/1989 | Japan . |
| 1-304837 | 12/1989 | Japan . |
| 8-112052 | 5/1996 | Japan . |
| 1369256 | 10/1974 | United Kingdom . |

OTHER PUBLICATIONS

Fly Lines; A.J. Hand; Tackle Guide '88; Mar. 1988; pp. 40–43.

*Primary Examiner*—Erma Cameron
*Attorney, Agent, or Firm*—Harold A. Burdick

[57] ABSTRACT

An improved method for manufacture of coated fiber material, for example a composite fly fishing line, is disclosed. The method includes coating fiber of a first material with a hot melt adhesive material. For fly lines, indices of refraction of the materials are preferably selected so that the finished product is substantially transparent absent addition of pigment. The coated fiber material is exposed to electron beam treatment to improve the physical profile of the coating.

19 Claims, 2 Drawing Sheets

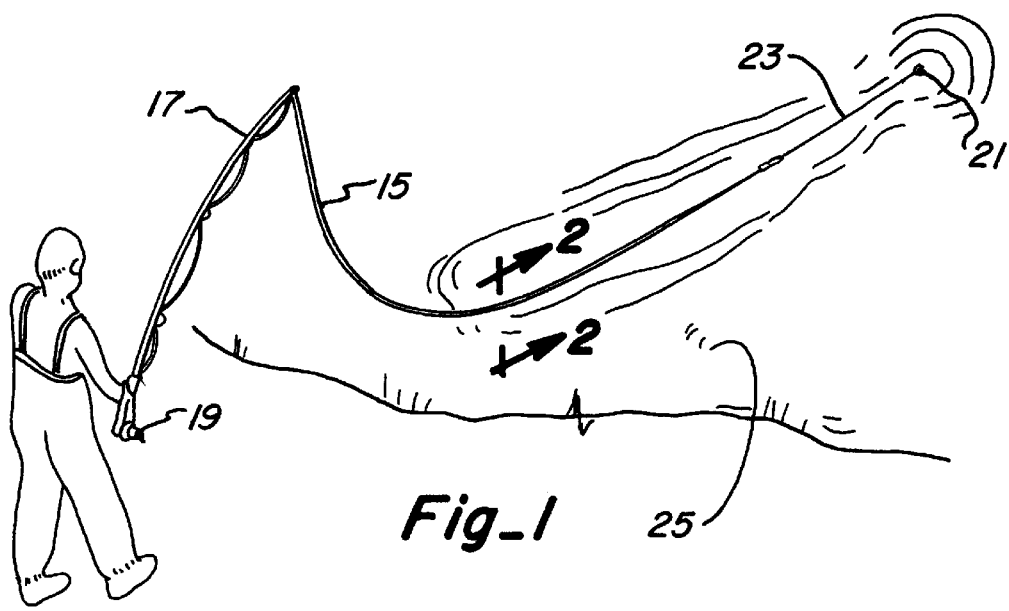
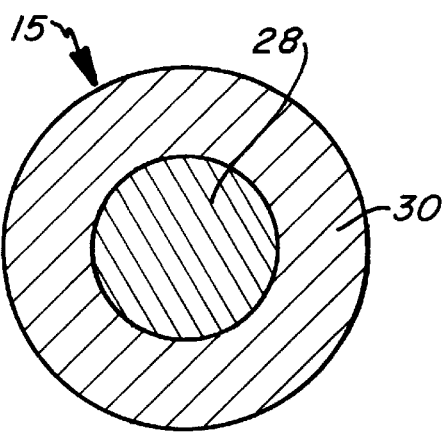
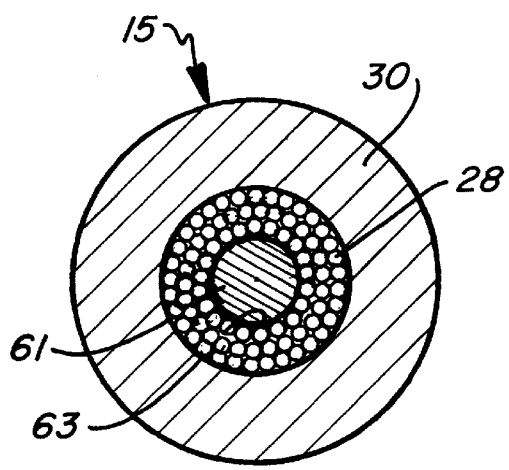

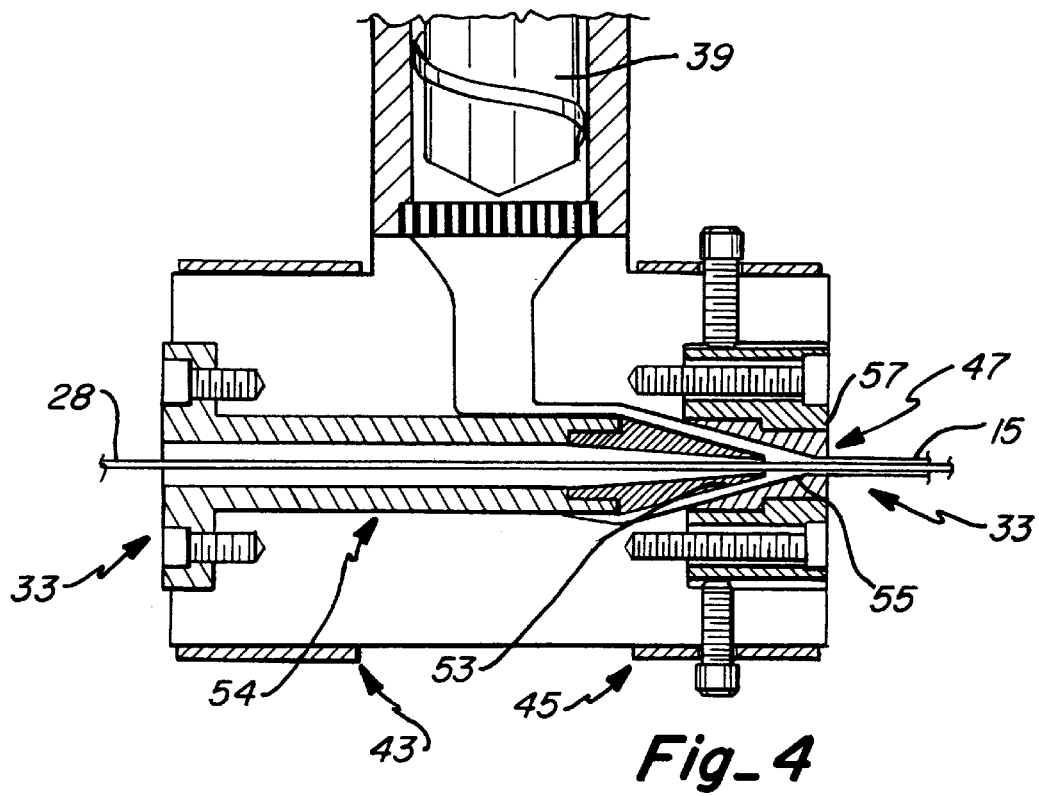
Fig_4
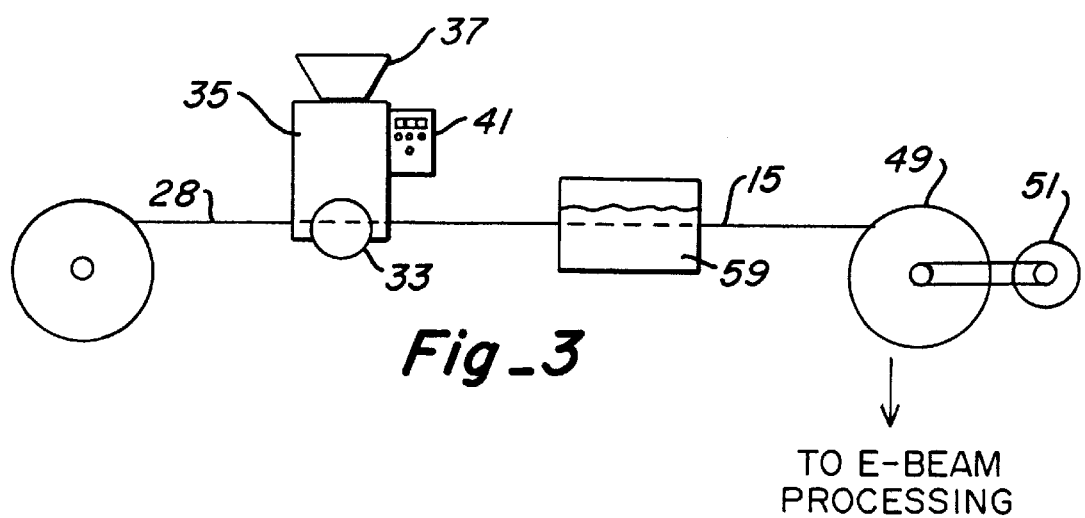
Fig_3
TO E-BEAM PROCESSING

METHOD OF MANUFACTURE OF COATED FIBER MATERIAL SUCH AS A FLY LINE

RELATED APPLICATION

This application is a division of U.S. patent application Ser. No. 08/251,244 filed May 31, 1994, now U.S. Pat. No. 5,625,976, and entitled "FLY LINES" by Robert H. Goodale.

FIELD OF THE INVENTION

This invention is related to fiber coating methods, and, more particularly, relates to methods for making fly fishing lines.

BACKGROUND OF THE INVENTION

Hydrophobic synthetic materials are known to be well adapted as fishing line, netting and the like, and, more particularly, composite lines made from such materials have been heretofore suggested and/or utilized for buoyant fly fishing lines.

For fly fishing (or casting), buoyant lines are often utilized. Such lines must have a specific gravity of less that about 1.15 or the surface tension of a still body of water will not be sufficient to keep the line afloat. However, since both the end of the leader and the fly (or lure) attached to the line are light weight, substantially all of the mass required for propelling, or casting, the fly to a desired position on the water is necessarily in the fly line itself. Moreover, while sufficient mass is required, bulk (cross-sectional size) of the line is desirably minimized to avoid undue wind resistance when casting.

Buoyant composite lines heretofore known and/or utilized have included lines having a braided nylon filament core with a vinyl plastisol coating, with the coating having microspheroids blended thereinto to promote buoyancy. Lines having a core made of the fiber known as "KEVLAR" with a polyester urethane coating which is foamed to provide a multiplicity of air pockets to promote buoyancy have also been illustrated (see, for example, U.S. Pat. No. 3,043,045 and the article by A. J. Hand appearing in the March 1988 issue of Rod and Reel).

Floating fly lines such as those heretofore known have always exhibited, because of the materials and/or methods utilized in their manufacture, at least some degree of opaqueness, transparent or substantially transparent floating fly lines being thus unknown.

From the foregoing, it is apparent that a fly fishing line having a specific gravity which is low enough so that the line remains buoyant and lands consistently lightly on the surface of the water, while yet providing sufficient mass to maintain desired casting characteristics and cast distance, is in demand. Such a line preferably optimizes air resistance characteristics during casting by reducing line bulk, is durable and less subject to hardening and cracking over time (due, for example, to migration of plasticizers from the line coating material), and is substantially free of abrasive surface characteristics. In many uses, a substantially clear, or transparent, floating fly line would be highly desirable to minimize the obtrusiveness of the fly line on the water, for example where low water levels are present and thus line presentation without substantial disturbance of fish is difficult at best.

Moreover, methods and polymeric materials, such as vinyl plastisols, utilized for a wide variety of fabric and substrate coating applications are known and/or utilized. However, many require long periods of exposure of the coating after application to elevated temperatures (usually above about 350° F.) to cure the coating. Difficulties are inerrant therein, for example when the fabric or substrate is heat sensitive. Many such coatings may also become brittle over time, stiffen with low temperature exposure, are solvent sensitive, and are subject to separation from their underlayment. Further improvement could thus be utilized.

SUMMARY OF THE INVENTION

This invention provides improved methods for making coated fiber materials and is applicable for a variety of fiber materials, including woven, knit, braided and monofilament fiber materials. One method includes the steps of coating a fiber material with a hot melt adhesive polymer material and exposing the coated fiber material to electron beam treatment. Improved coating adherence, less tendency of the coated material to become brittle over time, inherently lower material specific gravity, low temperature processing, more solvent resistance, and improved low temperature flexibility are thus realized.

More particularly, this invention provides a method of making a composite fishing line that includes the steps of coating a core line portion of a first material with a second material different from the first material, and selecting the first and second materials to have sufficiently similar indices of refraction so that the fishing line is substantially transparent absent addition of pigment to the first or second material. The method preferably includes the steps of passing the core line portion through a crosshead die and coating the core line portion as it is passing through the die with a hot melt adhesive polymer material at an elevated temperature. Exposure time of the core line portion to the elevated temperature before cooling of the coating begins is limited. The core line portion is preferably one of nylon, polypropylene and polyester material.

Utilizing the methods of this invention, improved fishing lines (both primary lines and leader/butt, sections), and more particularly fly fishing lines, are provided. Lines thus manufactured and used for floating lines have a specific gravity of less than 1 without the necessity of the addition of microspheres or blowing agents, are durable and less subject to cracking and hardening, and have sufficient mass, but without undue bulk, so that good casting characteristics are maintained. In one preferred embodiment, the lines are substantially clear (i.e., transparent).

The hot melt adhesives utilized in the method of this invention applied to fishing lines preferably include a copolymer of olefin and acrylic material, with the coating material having a specific gravity of less than 1. The core line portion may be made of material having a specific gravity of greater than 1, with the overall line yet having a specific gravity of less than 1.

The olefin is preferably an ethylene material, and, more particularly, the copolymer is preferably either ethylene ethyl acrylate copolymer used in association with a styrene butadiene polymer (for pigmented lines) or an ethylene acrylic acid copolymer (for transparent lines and with a nylon core). Other polymers and copolymers could be utilized. The core material may be multifilament (braided or yarn) or monofilament in form.

It is therefore an object of this invention to provide improved methods of manufacture of coated fiber material.

It is another object of this invention to provide a method for making coated materials exhibiting improved coating adherence, less tendency of the coated material to become brittle over time, inherently lower material specific gravity, low temperature processing, more solvent resistant coated materials, and material flexibility at low temperatures.

It is still another object of the invention to provide improved fishing line manufacturing methods.

It is another object of this invention to provide improved fly fishing line and leader manufacturing methods.

It is still another object of this invention to provide a method of making a fly line which is substantially transparent.

It is yet another object of this invent on to provide a method of making fly lines using a crosshead die.

It is yet another object of this invention to provide a method of making a composite fishing line that includes the steps of coating a core line portion of a first material with a second material different from the first material, and selecting the first and second materials to have sufficiently similar indices of refraction so that the fishing line is substantially transparent absent addition of pigment to the first or second material.

It is still another object of this invention to provide a method of making improved coated fiber material including the steps of coating a fiber material with a hot melt adhesive material, and exposing the coated fiber material to electron beam treatment.

It is yet another object of this invention to provide a method of making fishing line including the steps of passing a core line of one of nylon, polypropylene and polyester material through a crosshead die, coating the core line passing through the die with a hot melt adhesive polymer material that is at an elevated temperature and has an index of refraction similar to the core line, and limiting exposure time of the core line to the elevated temperature before cooling of the coating begins.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is an illustrative view of the fly line of this invention shown in use;

FIG. 2 is an enlarged cross sectional view of the fly line of FIG. 1 taken along section line 2—2 thereof;

FIG. 3 is a diagrammatic illustration of the method of manufacture of this invention;

FIG. 4 is a sectional illustration of a die used in the method of FIG. 3; and

FIG. 5 is a sectional illustration of a method of this invention for affixing a leader section to a fly line of this invention having a braided core line.

DESCRIPTION OF THE INVENTION

Referring to the drawings, fly line 15 of this invention is shown in FIG. 1 in use in association with fly fishing rod 17 and reel 19 for casting lure, or fly, 21. Fly 21 is attached to line 15 using leader and/or butt section 23. The fly, leader, and line are all configured for floating on the surface of water 25.

As shown if FIGS. 2 and 5, line 15 is a composite line including core line portion 28 and coating portion 30. The core line portion may be made of any one of braided nylon multifilament fiber (FIG. 5), multifilament nylon yarn, monofilament nylon fiber (FIG. 2), or multifilament polypropylene and/or polyester materials (though nylon materials are preferred for application with the transparent fly line embodiment of this invention discussed hereinafter). The coating portion preferably includes a copolymer of olefin (preferably ethylene) and acrylic material (two of which copolymers are discussed herein below), though copolymers of ethylene and vinyl acetate material (such as ULTRATHENE), methyl acrylate (such as ACRYTHENE), and/or blends of two or more of the copolymers (such as ethylene terpolymers, for example a terpolymer of ethylene, methyl acrylate and acrylic acid known as ESCOR), could also be utilized.

The materials utilized for the coating portion in the methods of this invention are generically known as hot melt adhesive polymers. Such materials are typically characterized by a molecular weight less than 30,000 amu (for example, around 17,000 amu for ethylene acrylic acid copolymer), while conventional general purpose polymers typically have molecular weights exceeding 100,000 amu (atomic mass unit). Heretofore, these polymers were not felt to have sufficient physical toughness for many material applications. Characterized by low melt temperatures and pumpability (using heated hoses, for example), but with physical profiles substantially less than conventional general purpose extrusion and injection molding grade polyolefin based polymers, their use has been mostly limited to adhesive applications for which they are specifically designed. Their specific use as a fiber material coating (with electron beam processing utilized to improve their physical properties as discussed below) has thus not been foreseen.

Coating 30, for more cold weather lines, is preferably a mixture of about 10 to 95% (preferably about 10 to 30%) ethylene ethyl acrylate copolymer (EEA, one example of a hot melt adhesive) (for example, Union Carbide DPD 6169, DPD 9169 or a blend thereof depending on desired molecular weight) with about 5 to 90% (preferably about 70 to 90%) styrene butadiene polymer (for example, Stereon 840A by Firestone Synthetic Rubber & Latex), the mixture ratios depending on the likely zones (from temperate to arctic and subarctic) of use of the line. Both polymers have a specific gravity of less than 1. Dry particle additives may be mixed with the polymer blend pellets as desired. Such additives may include pigments, metal powders (to provide sinking lines), lubricants and ultraviolet absorbers.

Another coating suitable for cold water lines is a mixture of about 40 to 60% ethylene terpolymer (such as ESCOR, an ethylene, methyl acrylate and acrylic acid terpolymer) blended with about 40 to 60% ethylene ethyl acrylate. Again, various additives may be utilized as desired.

The clear, or transparent, floating fly line provided by this invention preferably uses a core line portion 28 of monofilament nylon fiber and a polymer coating portion 30 of ethylene acrylic acid copolymer (EAA, another example of hot melt adhesive), a clear polymer having a specific gravity of less than 1 (for example, Dow Chemical Primacor 59801/ 59901, XU60751.15, XU60751.16 or blends thereof depending on desired molecular weight). Flexibility may be improved by addition of 5 to 20 parts of a non-migrating solid plasticizer (such as the trademark product ELVALOY 742, a copolymer of vinyl acetate and carbon monoxide). The use of monofilament nylon and a copolymer of the same or sufficiently similar refractive index (which is true of the example given above) produces the substantially optically clear line. This line is also quite appropriate in warmer climates. Other additives, as before, may be intermixed.

While the core material may have a specific gravity greater than 1 (nylon for example), when coated, line 15 of this invention has a specific gravity of less than 1.

Other coating materials may be provided. For example, a blend of EAA and ethylene vinyl acetate (EVA, still another example of a hot melt adhesive) in ratios ranging from 100 parts EAA to 15 parts EVA to 100 parts EAA to 100 parts EVA could be utilized. Other compatible polymers, including ethylene terpolymers disclosed above and copolymers such as ethylene methyl acrylate, and having the preferred low temperature processing characteristics (i.e., pumpability), could be utilized. Many of these hot melt adhesive polymers are compatible and permit tailoring the coating material for specific climatic conditions ranging from subarctic to tropical.

The same materials utilized in the clear floating line described above are use in the leader/butt section 23 of this invention. The butt section will normally be two to three feet in length. As an example, in order to provide a floating leader/butt section using a core line portion of nylon monofilament having a diameter of 0.018" with a specific gravity of 1.14, it is necessary to apply a coating of 0.96 specific gravity clear polymer such that the total leader/butt section diameter is no less than about 0.038". The butt section of the leader possesses the largest diameter, and may be attached, or tapered, to a lesser diameter which, although having a higher specific gravity, will float because of the surface tension of the water (i.e., total leader length may range from six to 12 feet and may be segmented or tapered down to a leader diameter of 0.005" or slightly less depending upon the sensitivity of the dry fly presentation).

Application of the polymer blend coating materials to the core line portion are illustrated in FIGS. 3 and 4 (it should be noted that the method of this invention as hereinafter described may be utilized with a wide range of materials, including coatings of PVC and other materials not specifically encompassed within the scope of the fly lines of this invention). Core line 28 is passed through crosshead die 33 of extruding unit 35. Feed of the polymer pellets to die 33 is supplied from hopper 37 by a single screw plastic extruder 39.

As the polymer mixture passes through the extruder and crosshead die extrudate temperatures can range as high as 400° F. depending on the material and the various zone temperature settings selected at control unit 41 for control of band heaters 43 and 45 (additional zones could be utilized if desired).

Die opening 47 typically ranges from 0.040" to 0.056" depending on the weight of line to be produced. Line tapers are achieved by varying the speed at which the core line passes through the die, for example by controlling the take up speed at reel 49 using motor 51. For example, a 0.052" die opening with a core line speed of about 15 feet per minute and a screw speed on the extruder of 13 RPM will produce line diameters up to about 0.080". By increasing line speed to about 40 feet per minute, line diameter drops to between about 0.048 to 0.052". Core line speeds may vary (and die opening sizes may be adjusted) as necessary to achieve a selected line diameter.

However, to accommodate the criticality of centering of core line 28 made of the materials adapted for this use, relative to die opening 47 (i.e., so that an even distribution of coating materials is achieved), it was found that the die had to be modified by moving guider tip 53 of mandrel 54 closer to outlet opening 55 of die holder 57 (to within about 0.060", this gap normally being in the range of about 0.200" for most better known operations).

The elevated temperature coating technique described herein limits exposure between the polymer coating and core line to less than two seconds, depending on the speed of line 28 through die 33, and preferably to less than one second in the case of a nylon core line, before cooling begins at cooler (a water bath for example) 59. For example, tensile strength of nylon core material is detrimentally affected by extended high temperature exposure (+358° F.), and exhibits outgassing with extended exposure to temperatures over about 345° F., the result of which is undesired bubbles in, and thus a rough, coating. Other core line material are even more sensitive. It is thus imperative to overall line integrity that the sensitive core materials be exposed to the elevated temperatures necessary for smooth application of the coating materials for a very short time.

The method so far described herein does not use a primer to achieve a bond between the core and polymer coating as is required in many prior manufacturing techniques. A superior bond may be achieved utilizing electron beam processing of coated lines as discussed below, but is not necessarily required. This is so because no significant bond is required between core line portion 28 and coating portion 30, since line backings, leaders and the like are attached directly to core line portion 28 or otherwise made secure to the line. Although coating portion 30 achieves no significant bond to the core, it provides a tough and flexible envelop around the core that is highly resistant to circumferential cracks.

For example, splicing of line backing to the fly line is achieved by peeling about 3" of coating from the core. A conventional blood knot may be used to accomplish the splice. A drop of cyanoacrylate super glue applied to the knot further enhances the splice.

In accord with another aspect of this invention, for splicing monofilament nylon leader to a line 15 having a braided core portion as shown in FIG. 5, approximately ½ of coating 30 is peeled from braided core 28. Leader/butt section 61 (which may be a conventional monofilament fiber or leader/butt section 23 as described hereinabove) is primed with a glue (for example, cyanoacrylate super glue) and then threaded through center 63 of braided core 28 such that it meets or exceeds a distance about equal to resumption of the coated portion 30 of line 15. The glue is then applied such that it saturates the exposed braided core 28 having leader/butt section 61 therein.

This splicing technique for leader to fly line may be further enhanced by adding a fluorescent pigment to the solvent mixture in order to provide a highly visible and floating indicator for the fly line. In addition, the splicing technique can be utilized for adding a sinking line section to a floating line when both line sections have a braided core. In this situation a 1" section of approximately 20 pound monofilament is used with ½ segments spliced onto each of the line segments in question following the procedure previously described.

Returning to FIG. 3, after coating, the lines may advantageously be electron beam processed to elevate their physical characteristics by non-chemical cross-linking of coating and core. For coating materials of this invention, a line is exposed to from 1 to 50 megarads (preferably 10 to 15 megarads) of electron beam irradiation at a rate of about 1 megarad per sweep (utilizing known electron beam irradiation techniques and equipment, for example as provided by companies like E-Beam Services, Inc.).

With electron beam processing, incident electrons transfer enough energy to the molecular structure of the bombarded polymer to break bonds and create free radicals. Free radicals then interact with each other to form cross-links. This "locking together" of polymer molecules is the underlying cause of the beneficial performance changes associated with cross-linking, i.e., increased tensile strength, abrasion resistance, improved solvent resistance, as well as resistance to deformation. These bonds are covalent in nature and the cross-linking reactions are considered irreversible.

Alternatively, accelerated electrons have sufficient energy to cleave almost any chemical bond. As a rule, polymers containing a hydrogen atom at each carbon atom predominantly undergo cross-linking, whereas polymers containing quaternary C atoms or polymers having a structure of —$CX_2$—$CX_2$ where X is a halogen tend to degrade. This degradation process is called chain scissioning. During irradiation, chain scissioning occurs simultaneously and competitively with cross-linking, the end results of which are determined by the ratio of the yield of the two reactions. The ratio of cross-linking to degradation depends on factors including total dose, dose rate, the presence of oxygen, stabilizers, radical scavengers and steric hindrances derived from structural or crystalline forces.

The use of electron beam processing to elevate the physical properties of hot melt adhesive polymer materials heretofore discussed makes these materials appropriate for a wide variety of coating applications for fiber materials (whether woven, knit, braided or monofilament fiber materials) not heretofore considered. This technique can be used to produce shielded monofilament nylon used as a leader material or shock tippet. This method may be applied to provide other improved monofilament or braided fiber materials, for example for use as racquet strings (utilizing a monofilament nylon based type 6—6 nylon, type 6 caprolactam, or copolymer nylon designated type 10, 11 and 12, for example) or strings for musical instruments.

Acceptance of opaque fly lines in the market place based on the above disclosed methods represents an application where a radiated hot melt coated line can replace floating fly lines based on vinyl plastisols coated over braided nylon.

Moreover, use of hot melt adhesive polymers with electron beam processing methods as disclosed herein for coatings on a wide variety of fabrics (both synthetic and natural) or other substrates is also within the scope of this invention (utilizing known application techniques other than crosshead die application). In all cases, what emerges is a self-adhering, 100% solids liquid polymer system that can compete with vinyl plastisols for fiber, fabric and conformal coating. The system thus utilized has many advantages, including self adherence, lack of plasticizer migration, lower inherent specific gravity, lower temperature processing (below about 350° F. and commonly below about 300° F.) for heat sensitive substrates or cores, solvent resistance, fewer adverse by-products upon combustion, and low temperature flexibility.

What is claimed is:

1. A method of making a composite fly fishing line comprising the steps of:
    coating a core line portion of a first material with a second material different from said first material, said second material being a hot melt adhesive polymer; and
    selecting said first and second materials to have sufficiently similar indices of refraction so that the fishing line is substantially transparent absent addition of pigment to said first or second material.

2. The method of claim 1 wherein said second material includes a copolymer of olefin and acrylic material and has a specific gravity of less than 1.

3. The method of claim 2 wherein said olefin is ethylene.

4. The method of claim 1 wherein said second material is a hot melt adhesive olefin based polymer, said method further comprising the step of exposing said coated core line portion to electron beam treatment.

5. The method of claim 4 wherein said hot melt adhesive has added thereto a solid plasticizer.

6. The method of claim 1 wherein said first and second materials are selected to provide a coated core line portion having a specific gravity less than 1.

7. The method of claim 1 wherein said first material is one of nylon, polypropylene and polyester material, and wherein said second material includes a copolymer or terpolymer of olefin material and at least one of acrylic acid material, ethyl acrylate material, vinyl acetate material, methyl acrylate material, and styrene butadiene material.

8. A method of making coated fiber material comprising the steps of:
    coating a fiber material with a hot melt adhesive olefin based polymer material having a melt temperature of less than about 400° F.; and
    exposing said coated fiber material to electron beam treatment.

9. The method of claim 8 further comprising the step of selecting said fiber material from a group including any of a woven material, a knit material, a multi-strand braided material, and a monofilament material.

10. The method of claim 8 wherein said hot melt adhesive material has a molecular weight designation less than about 30,000 amu.

11. The method of claim 8 further comprising selecting said fiber material and said hot melt adhesive material to have sufficiently similar indices of refraction so that finished coated fiber material is substantially transparent absent addition of pigment to said fiber material or said hot melt adhesive material.

12. The method of claim 8 further comprising selecting said fiber material from a group including nylon, polypropylene and polyester material, and wherein said hot melt adhesive material includes at least one of ethylene acrylic acid copolymer, ethylene ethyl acrylate copolymer, ethylene vinyl acetate copolymer, ethylene methyl acrylate copolymer, and ethylene terpolymer.

13. The method of claim 8 further comprising the step of selecting said fiber material and said hot melt adhesive material so that finished coated fiber material has a specific gravity less than 1.

14. A method of making fly fishing line comprising:
    passing a core line of one of nylon, polypropylene and polyester material through a crosshead die;

coating said core line passing through said die with a hot melt adhesive polymer material that is pumpable at temperatures below about 400° F.; and cooling said coated core line after passage through said crosshead die within less than about two seconds.

15. The method of claim 14 wherein said hot melt adhesive polymer material includes a copolymer of olefin and acrylic material having an index of refraction similar to said core line.

16. The method of claim 14 further comprising the step of exposing said coated core line to electron beam treatment.

17. The method of claim 14 wherein said coating material includes an ethylene acrylic acid copolymer.

18. The method of claim 14 wherein said coating material includes a styrene butadiene polymer and an ethylene ethyl acrylate copolymer.

19. The method of claim 14 wherein said core line is a braided material.

* * * * *